United States Patent
Mikami et al.

(10) Patent No.: US 7,103,283 B2
(45) Date of Patent: Sep. 5, 2006

(54) TRANSMISSION CHARACTERISTIC COMPENSATION CONTROL SYSTEM

(75) Inventors: Satoshi Mikami, Sapporo (JP);
Kouichi Sawada, Sapporo (JP);
Hiroshi Nishimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 607 days.

(21) Appl. No.: 10/123,244

(22) Filed: Apr. 17, 2002

(65) Prior Publication Data
US 2003/0081292 A1 May 1, 2003

(30) Foreign Application Priority Data
Oct. 30, 2001 (JP) ............................. 2001-332810

(51) Int. Cl.
*H04B 10/00* (2006.01)
(52) U.S. Cl. .................... 398/159; 398/158; 398/147; 398/79; 398/81; 398/33; 398/25; 398/26; 398/27; 398/28; 398/29
(58) Field of Classification Search .................. 398/9, 398/33, 81, 147, 158, 159, 79, 25, 26, 27, 398/28, 29; 359/161, 337.11; 259/110
See application file for complete search history.

(56) References Cited

U.S. PATENT DOCUMENTS 5,815,294 A * 9/1998 Ishikawa et al. ............ 398/158

6,067,187 A * 5/2000 Onaka et al. ............ 359/337.11

FOREIGN PATENT DOCUMENTS

| JP | 8-340304 | 12/1996 |
|---|---|---|
| JP | 2001-251247 | 9/2001 |

OTHER PUBLICATIONS

OFC '97 Technical Digest, Feb. 16, 1997.
APCC/OECC '99 Oct. 18, 1999.
Japanese Patent Office, Patent Abstracts of Japan, Publication No. 2001251247A.

* cited by examiner

*Primary Examiner*—Hanh Phan
(74) *Attorney, Agent, or Firm*—Staas & Halsey LLP

(57) ABSTRACT

A transmission characteristic compensation system enables to reduce the generation of transmission deterioration by estimating an initially selected control direction, and also to compensate in advance with a setting value estimation so as to suppress the generation of transmission deterioration in advance. The transmission characteristic compensation control system includes a variable compensator having a control circuit; and an optimal setting value calculation portion for calculating an optimal setting value for the control circuit, wherein the optimal setting value calculation portion estimates future transmission deterioration on a predetermined time-by-time basis to set into the control circuit the optimal setting value for compensating the estimated transmission deterioration performed by the variable compensator.

19 Claims, 9 Drawing Sheets

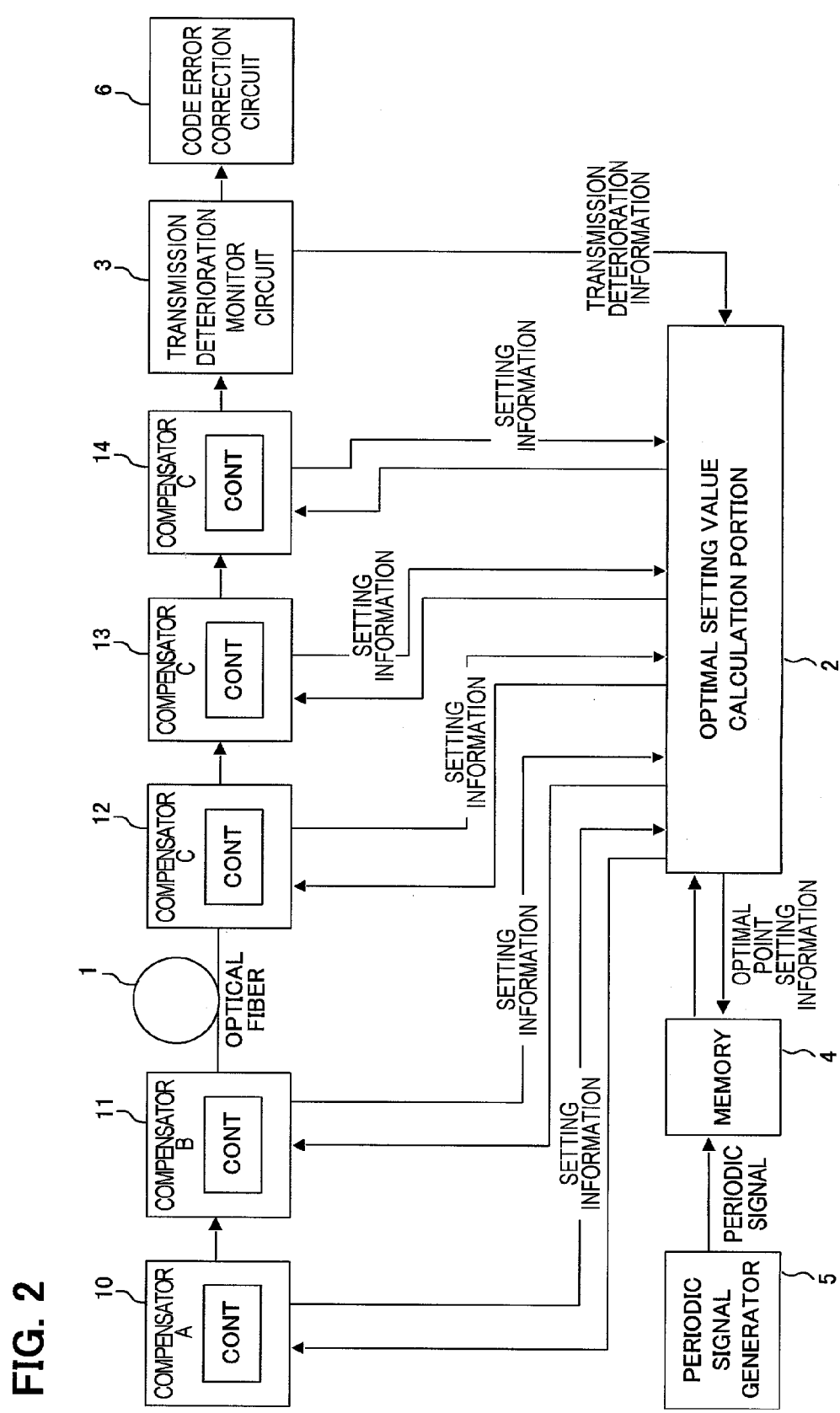

US 7,103,283 B2

TRANSMISSION CHARACTERISTIC COMPENSATION CONTROL SYSTEM

FIELD OF THE INVENTION

The present invention relates to a transmission characteristic compensation control system and an optical communication system appropriate for large capacity long-haul optical transmission system.

BACKGROUND OF THE INVENTION

In recent years high-speed transmission has been achieved using an optical transmission system. A 10 Gbps optical transmission system has become in practical use. Currently 40 Gbps optical transmission system is under development. Meanwhile, as transmission speed increases, optical signal waveform becomes deteriorated caused by wavelength dispersion in an optical fiber, a polarized wave dispersion in both the optical fiber and an optical circuit, nonlinear effect, ASE (amplified spontaneous emission) noise produced in an optical amplifier, etc. This deterioration of optical signal waveform becomes a main factor to restrict transmission distance.

For this reason, when transmitting for more than hundreds of kilometers with the speed of 40 Gbps, compensation against waveform deterioration is strictly required. When compensating, however, a plurality of automatic compensation systems are required to cope with the above-mentioned various factors producing waveform deterioration.

Further, to control such compensation, it is required to minimize the deterioration of transmission quality caused by this control itself.

One method for controlling transmission characteristic using a plurality of compensators, there is disclosed a configuration in the official gazette of Japanese Unexamined Patent Publication No. Hei-9-326755, which is shown in FIG. 1. The system is configured with a receiver 100 and an automatic equalization controller 200. In receiver 100, an optical amplifier 101 is provided for optical-amplifying the signal with excited light produced by noise light generator 201 in automatic equalization controller 200.

The amplified optical reception signal is dispersively compensated in a variable dispersion compensation circuit 102 to convert into electric signal in opt-electric converter 103. An electric signal corresponding to the converted reception signal is amplified in an amplifier 104 to input to a clock extraction circuit 105 and a discrimination circuit 106. In discrimination circuit 106, electric signal level is discriminated at the timing of a clock signal regenerated in clock extraction circuit 105 according to the discrimination signal from an discrimination voltage generation circuit 107, to output to a reception code.

Meanwhile, in automatic equalization controller 200, an output error of discrimination circuit 106 is detected in an error detection circuit 202. Corresponding to the output from error detection circuit 202, noise light level in noise light generator 201 is controlled. Also, through a dispersion equalization controller 203 and a discrimination voltage controller 204, feedback control is performed respectively against variable dispersion compensation circuit 102 and discrimination voltage generation circuit 107.

In the conventional method shown in FIG. 1, on detecting an output error in error detection circuit 202, the feedback control is carried out by a variety of compensation circuits. Namely, in case of the configuration shown in FIG. 1, such compensation circuits include noise light generator 201, variable dispersion compensation circuit 102, discrimination voltage generation circuit 107.

As a variable wavelength dispersion compensation device constituting variable dispersion compensation circuit 102, there are employed a VIPA (virtually imaged phased array) device such as being disclosed by M. Shirasaki, et al., in "Dispersion compensation using the virtually imaged phased array" (APCC/OECC '99, pp. 1367–1370), and an FBG (fiber Bragg grating) such as being disclosed by M. M. Ohn, et al. in "Tunable fiber grating dispersion using a piezoelectric stack" (OFC '97, WJ3).

In the configuration shown in FIG. 1, a device such as VIPA (virtually imaged phased array) is applied as a variable wavelength-dispersion compensation device for dispersion compensation to vary dispersion values. In order to search a setting point to optimize a dispersion value, it is not possible to determine to which direction the search is carried out optimally (that is, the direction of the setting value to be varied either greater or smaller). For this reason, conventionally the control direction to the optimal setting point is determined by searching in any directions possible to search, thereby to monitor how many amount the transmission deterioration is produced.

In this method, if the selected moving direction is opposite to the direction of optimal setting, the transmission deterioration increases by the search. In addition, in the conventional method, a threshold value of the transmission deterioration is set so as to suspend to start until the deterioration exceeds the threshold value. Therefore, substantially large transmission deterioration is produced before the control is activated.

Also, in the conventional plurality of compensation methods against the control device, there is introduced a centralized control method in which each compensation circuit is managed with centralized control. In such a centralized control method, the control management becomes difficult as the number of compensation circuits increases. At the same time, it becomes difficult to increase the number of compensation circuits corresponding to the increase of communication speed or the expansion of communication distance. Therefore the method is short of expandability and flexibility.

SUMMARY OF THE INVENTION

Accordingly, it is an object of the present invention to provide a transmission characteristic compensation system and an optical communication system enabling to reduce the generation of transmission deterioration by estimating the initially selected control direction, and also enabling to compensate in advance with the setting value estimation so as to suppress the generation of transmission deterioration in advance.

According to the present invention to solve the aforementioned problem, as a first embodiment of the invention, a transmission characteristic compensation control system includes a variable compensator having a control circuit, and an optimal setting value calculation portion for calculating the optimal setting value for the control circuit. The above-mentioned optimal setting value calculation portion estimates future transmission deterioration on a predetermined time-by-time basis, to set into the control circuit the optimal setting value for compensating the estimated transmission deterioration performed by a plurality of variable compensators.

As a second embodiment of the transmission characteristic compensation control system according to the present invention, the transmission characteristic compensation control system further includes a transmission deterioration monitor circuit; and a memory for storing optimal setting values set in the control circuit in the past. The optimal setting value calculation portion obtains at the timing of each lapse of the predetermined time a setting value based on the past optimal setting value corresponding to the next predetermined timing being retained in the memory as the optimal setting value for compensation performed by means of the variable compensator.

As a third embodiment of the transmission characteristic compensation control system according to the present invention, the setting value obtained in the second embodiment based on the past optimal setting value stored in the memory is a calculation result of adding one half (½) of the difference between the optimal setting value in an average year and the historical setting value set on the preceding day to the optimal setting value in the average year.

As a fourth embodiment of the transmission characteristic compensation control system according to the present invention, in the second embodiment, the optimal setting value calculation portion orders feedback control to the variable compensator when the transmission deterioration monitor circuit detects transmission deterioration exceeding a threshold value before the predetermined lapse of time.

As a fifth embodiment of the transmission characteristic compensation control system according to the present invention, in the third embodiment, the optimal setting value calculation portion stores an average value between the historical setting value of the preceding day and the optimal setting value in the average year into the memory as a new optimal setting value in the average year.

As a sixth embodiment of the transmission characteristic compensation control system according to the present invention, in the fifth embodiment, the optimal setting value calculation portion stores the present setting value into the memory as a new historical setting value of the preceding day.

As a seventh embodiment of the transmission characteristic compensation control system according to the present invention, in the fourth embodiment, the feedback control is performed by determining setting value control direction based on the comparison of the transmission deterioration produced when the setting value is shifted in both positive direction and negative direction against the present setting value, and then the setting value is shifted in the determined direction to obtain the optimal setting value.

Further, as a first embodiment of an optical communication system according to the present invention, the optical communication system includes a plurality of variable compensators each having a control circuit, an optimal setting value calculation portion for calculating the optimal setting value for each control circuit in each plurality of variable compensators, a transmission deterioration monitor circuit; and a memory for retaining historical data of the optimal setting values. The optimal setting value calculation portion calculates the optimal setting value on a predetermined time-by-time basis based on both transmission deterioration detected by the transmission deterioration monitor circuit and the optimal setting values retained in the memory, to perform feedforward control against a setting value of the control circuit.

As a second embodiment of the optical communication system according to the present invention, in the first embodiment of the optical communication system, the plurality of variable compensators perform feedback control when transmission deterioration is detected by the transmission deterioration monitor circuit at the timing excluding when the optimal setting value calculation portion performs feedforward control on a predetermined time-by-time basis.

As a third embodiment of the optical communication system according to the present invention, in the second embodiment, the feedforward control against the setting value of the control circuit set by the optimal setting value calculation portion is performed successively one compensator by one out of the plurality of variable compensators.

As a fourth embodiment of the optical communication system according to the present invention, in the second embodiment, the plurality of variable compensators comprise at least two control combinations or more among light output power control, chirp parameter control, variable dispersion compensation control on the transmission side, polarization dispersion compensation control, variable dispersion compensation control on the reception side, and discrimination phase control.

As a fifth embodiment of the optical communication system according to the present invention, in the second embodiment, both the optimal setting value calculation being calculated on a predetermined time-by-time basis by the optimal setting value calculation portion and the feedforward control against the setting value of the control circuit are performed at variable intervals corresponding to the variation rate of transmission deterioration.

Other features of the present invention will become more apparent in the description of the preferred embodiments of the present invention referring to the accompanied charts and drawings.

BRIEF DESCRIPTION OF THE DRAWINGS

FIG. 2 shows a configuration of an embodiment of the present invention.

DETAILED DESCRIPTION OF THE PREFERRED EMBODIMENTS

Figure 1:
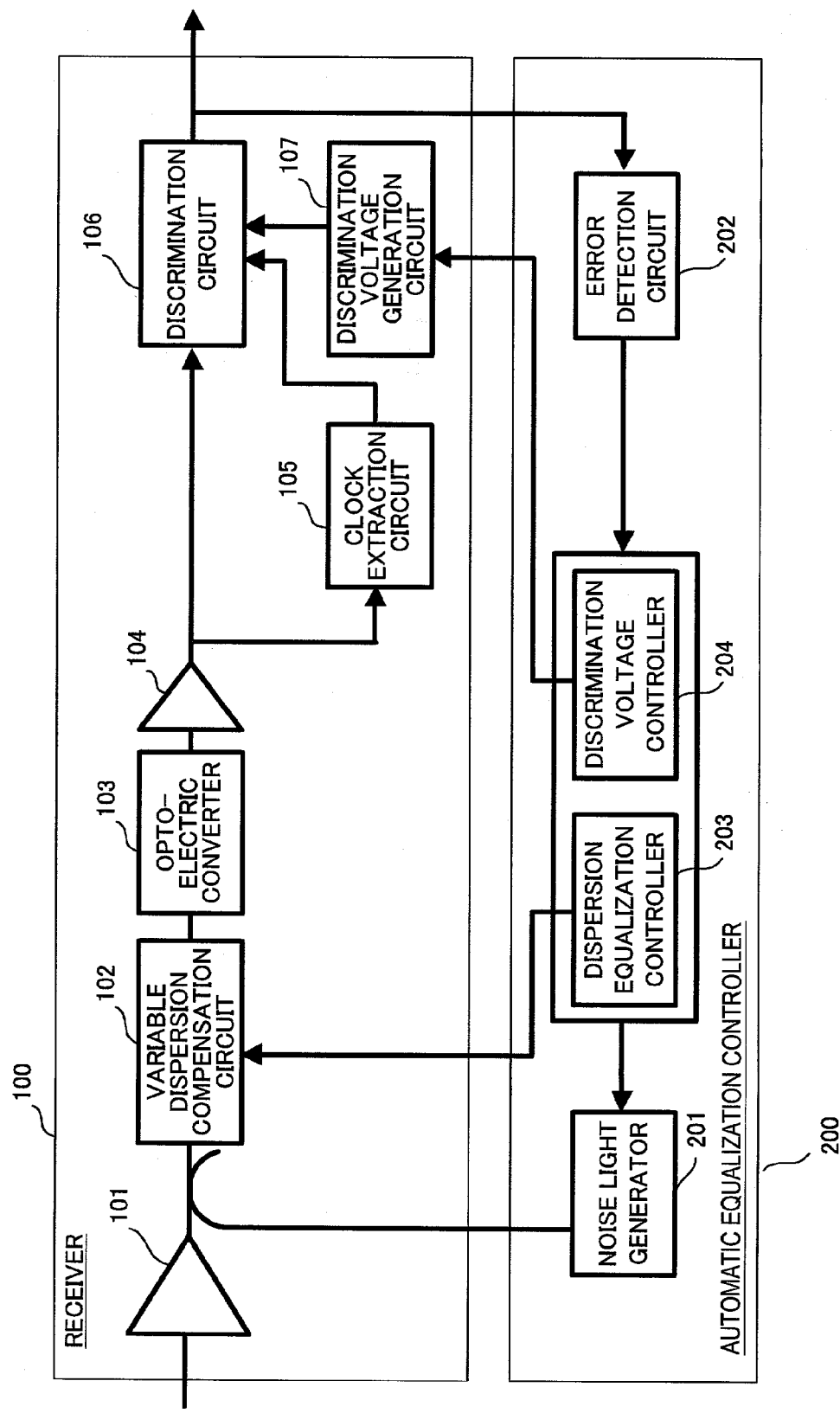
FIG. 1 shows a configuration disclosed in the official gazette of Japanese Unexamined Patent Publication No. Hei-9-326755.

The preferred embodiment of the present invention is described hereinafter referring to the charts and drawings.

In FIG. 2, there is shown a configuration of one embodiment of the present invention. A plurality of compensators 10–14 on the transmission side of the preceding stage of an optical fiber 1 and on the reception side of the succeeding stage of the optical fiber 1. Controller CONT is provided in each compensator 10–14.

Optimal setting value calculation portion 2 calculates an optimal setting value to determine based on both transmission deterioration information monitored by transmission deterioration monitor circuit 3 and the past data of optimal point setting information stored in memory 4. Error correction is performed by inputting a compensated signal into a code error correction circuit 6 through transmission deterioration monitor circuit 3.

Optimal setting value calculation portion 2 further forwards the calculated optimal setting value to each compensator 10–14. According to the setting value forwarded from optimal setting value calculation portion 2, it is possible to perform compensation control operation in each compensator 10–14 independently of the controller CONT.

Furthermore, the setting information set as a current optimal point is forwarded to memory 4 to store as a historical data. Periodic setting signal generator 5 generates a periodic signal at predetermined intervals, for example every one hour, to forward date/time information, etc. to memory 4.

In addition, based on the rate of transmission deterioration, the generation period of the periodic signal generated by periodic setting signal generator 5 is variably set. For example, in case the variation rate of transmission deterioration is slow, a periodic signal generation interval is set long, while in case the variation rate is fast, the signal generation interval is set short.

Here, as a major factor of transmission deterioration, variations caused by thermal variation of a fiber (wavelength dispersion and polarization dispersion) are considered. To cope with such a factor, information on both the annual variation or the daily variation is used to control to reduce the deterioration.

More specifically, the following function is performed by optimal setting value calculation portion 2 for controlling controller CONT in each plurality of compensators 10–14. Before the transmission deterioration condition being detected by transmission deterioration monitor circuit 3 reaches a threshold value for compensation, the setting information being set at the identical time both in the average year and on the preceding day is read out from memory 4. The setting control direction is then calculated to forward to each compensator 10–14 (feedforward control).

Figure 3A:
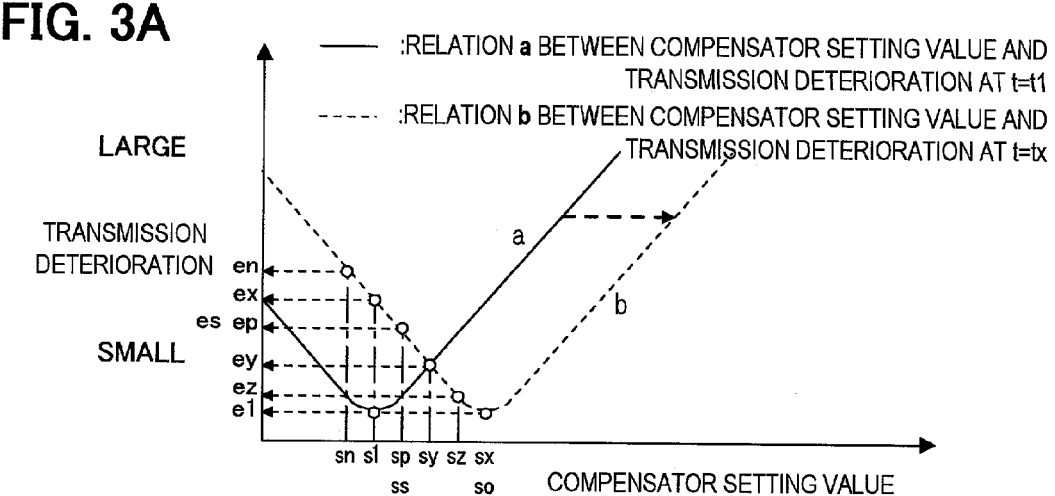
FIG. 3 show a diagram illustrating relation between compensator setting values and transmission deterioration.

The above-mentioned control method is further illustrated referring to FIG. 3, in which the relation between the setting value in the compensator and the transmission deterioration is shown. In FIG. 3A, a curved continuous line 'a' denotes the relation between the compensator setting value and the transmission deterioration at time t=t1, while a curved dotted line 'b' denotes the relation between the compensator setting value and the transmission deterioration at time t=tx. Here, the horizontal axis denotes the compensator setting value, and the vertical axis denotes the amount of transmission deterioration. For example, at time t=t1, if the optimal setting value is changed from s1 to sx caused by an environmental change, the transmission deterioration increases from e1 to ex.

Figure 3B:
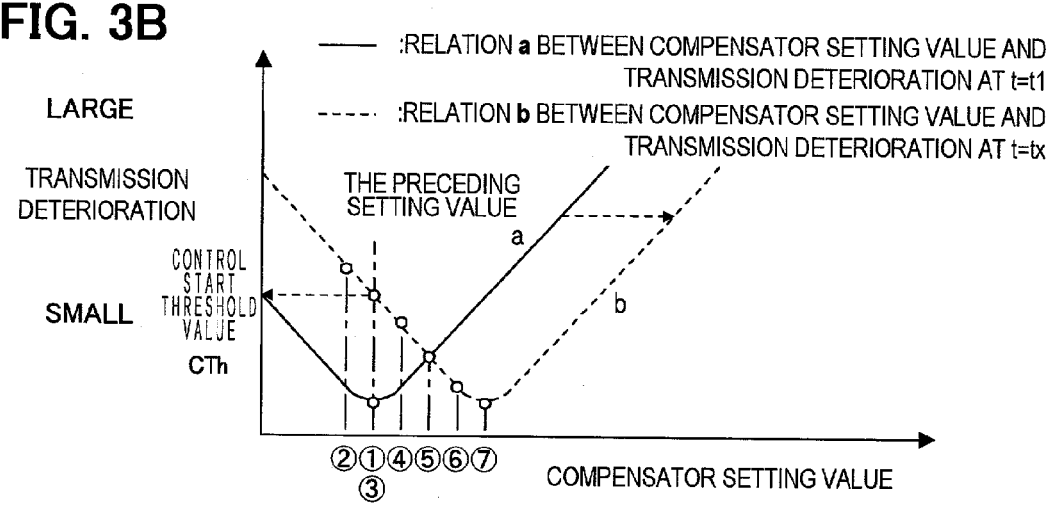

Under such relation, according to the conventional control method shown in FIG. 1, there is employed feedback control only. In such a method, as shown in FIG. 3B, the threshold value CTh for initiating the transmission deterioration control is set. When the actual value exceeds this threshold value CTh (in other words, after transmission deterioration exceeding this threshold value is produced), the search of optimal setting value is started. This may possibly cause to increase transmission deterioration, because at that moment it is not possible to determine the optimal search direction (the direction whether the setting value be increased or decreased).

Figure 3C:
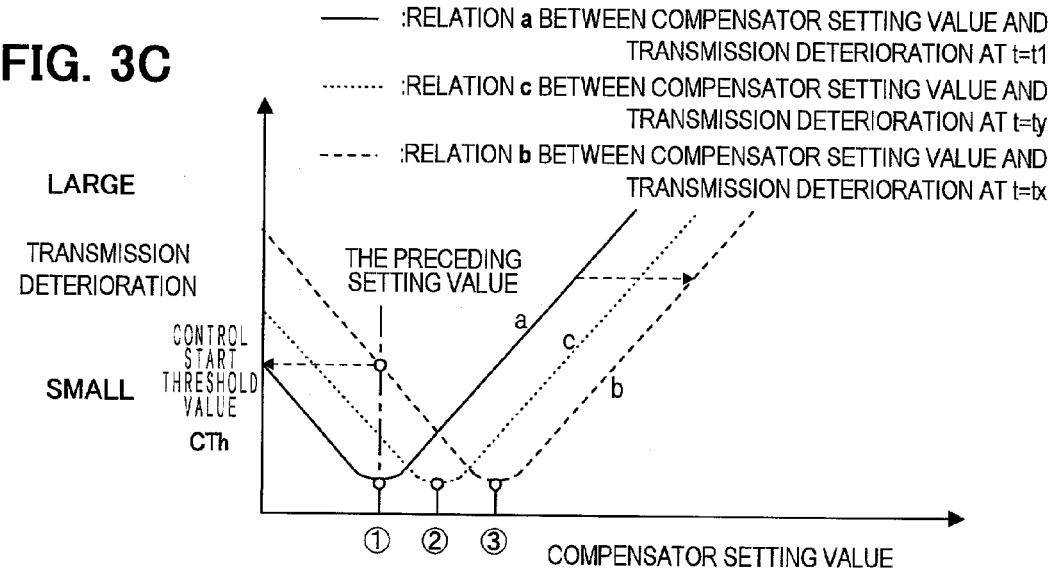

Compared to such a conventional method, an operation principle according to the present invention is shown in FIG. 3C. In this figure, it is detected that the optimal setting value ① in a curve 'a', which denotes the relation between the compensator setting value and the transmission deterioration at time t=t1, is changed to another optimal setting value ② in a curve 'c' at time t=ty. Accordingly, an optimal setting value at time t=tx can be estimated in advance as an optimal setting value ③ for the control of setting the optimal setting value (feedforward control). In such a manner, compared to the control method shown in FIG. 3B, the control is initiated before the threshold value CTh for starting the control reaches. Thus it becomes possible to prevent the generation of transmission deterioration.

Figure 4A:
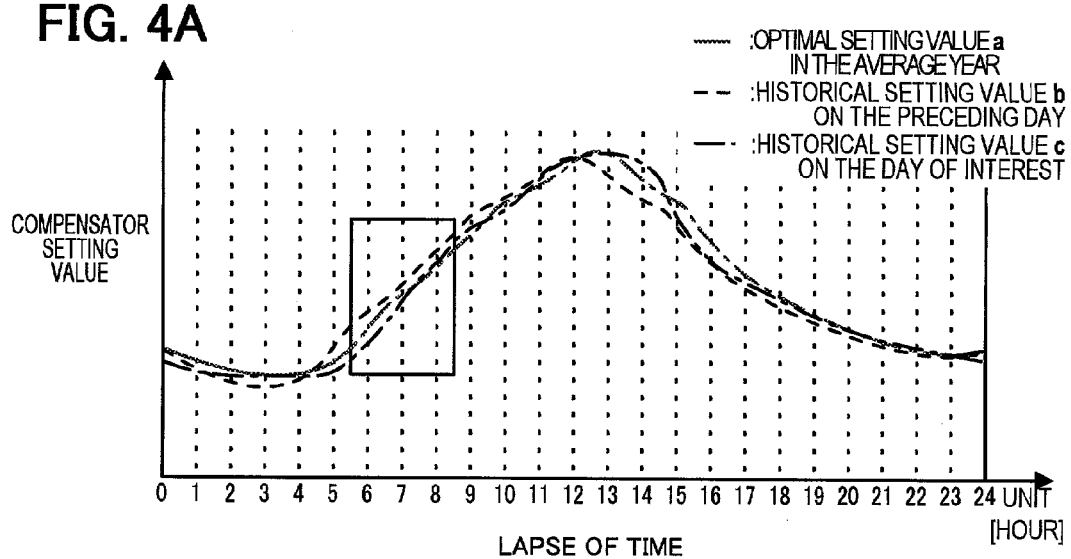
FIG. 4 show a typical example of a setting value for the compensator in the control according to the present invention.
Figure 4B:
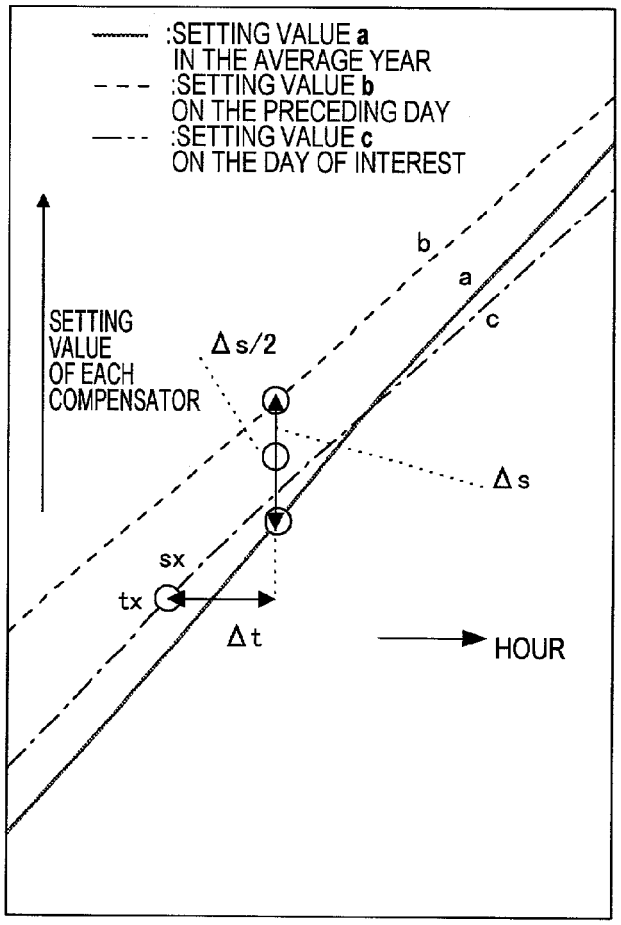

In FIG. 4, there is shown an explanation drawing of a typical example of compensator setting value according to the control method of the present invention. In FIG. 4A, the variation of the setting values for twenty-four hours in respect of the following cases is shown. The variation of; optimal setting values in the average year is shown as 'a'; historical setting values on the preceding day is shown as 'b'; and historical setting values of the day of interest is shown as 'c'. In FIG. 4B, there is shown an enlarged view of the range enclosed by a quadrilateral shown in FIG. 4A.

Considering the case of the past setting value having sx at time tx, the setting value to be set at the time after Δt is estimated. In the example shown in FIG. 4B, one half (½) of a difference Δs between a setting value 'a' of the average year and a setting value 'b' of the preceding day is added to the setting value 'a' of the average year. This value is set as a new setting value for feedforward control.

According to the present invention, as having been described above, an optimal setting value is calculated using an optimal setting value in the average year and a setting value being set on the preceding day, so as to perform feedforward control in accordance with the lapse of time. Here, an optimal setting value of the day concerned for dispersion compensation normally has a similar tendency to the setting value of the preceding day. In the method of the present invention, there is also considered a case of peculiar variation on the preceding day of interest caused by possible occurrence of abrupt environmental change.

For this purpose, according to the present invention, setting data 'b' of the preceding day and setting data 'a' of the average year are stored. These data are used to calculate the optimal setting value, as shown in FIG. 4B. In the example shown in this figure, one half (½) of the difference between the setting data 'b' of the preceding day and the setting data 'a' of the average year is calculated for determining a setting value.

Also, as will be illustrated later in the description of operation in the embodiment, if transmission deterioration is recognized as a result of setting according to the above-mentioned calculation result, the value is set again by means of feedback control. The difference between the set value and the calculation result is utilized in the next time of calculation. Thus the feedforward control and the feedback control are performed in combination.

Moreover, after the calculation, a new average-year data is obtained by averaging the setting data of the preceding day 'b' and the former average-year data 'a', to store into memory 4. In the feedback control according to the conventional method, a predetermined procedure is adopted to obtain the transmission deterioration condition at the setting positions smaller and larger than a current set value. More specifically, referring to FIG. 3A, the transmission deterioration conditions ('en' and 'ep') are obtained by shifting setting values from a current set value s1 in a predetermined manner, for example, first to the negative direction (sn) then to the positive direction (sp), or otherwise first to the positive direction (sp) then to the negative direction (sn). The obtained results of the transmission deterioration are mutually compared to determine an optimal setting point side (i.e. the 'sp' side in case of FIG. 3A).

In such a conventional method, in case a first moving direction is opposite to an optimal position side, the transmission deterioration is produced exceeding the threshold value CTh for starting the compensation operation, as shown in FIG. 3B.

To cope with this problem, according to the present invention, there is introduced a method the detail of which is explained hereafter referring to the operation flowchart. Namely, even in case of feedback control, the setting values near to the time concerned are extracted among the optimal compensator setting data having been stored in memory 4. A setting value for controlling the compensator is searched and set after determining the control direction either to the positive direction (sp) when s'2>s'1, or to the negative direction (sn) when s'1>s'2.

Accordingly, it becomes possible to complete moving to the optimal setting value without causing the transmission deterioration to exceed the threshold start value of compensation operation.

Now, the operation of the present invention is described hereafter using a typical example of the embodiment.

Figure 5:
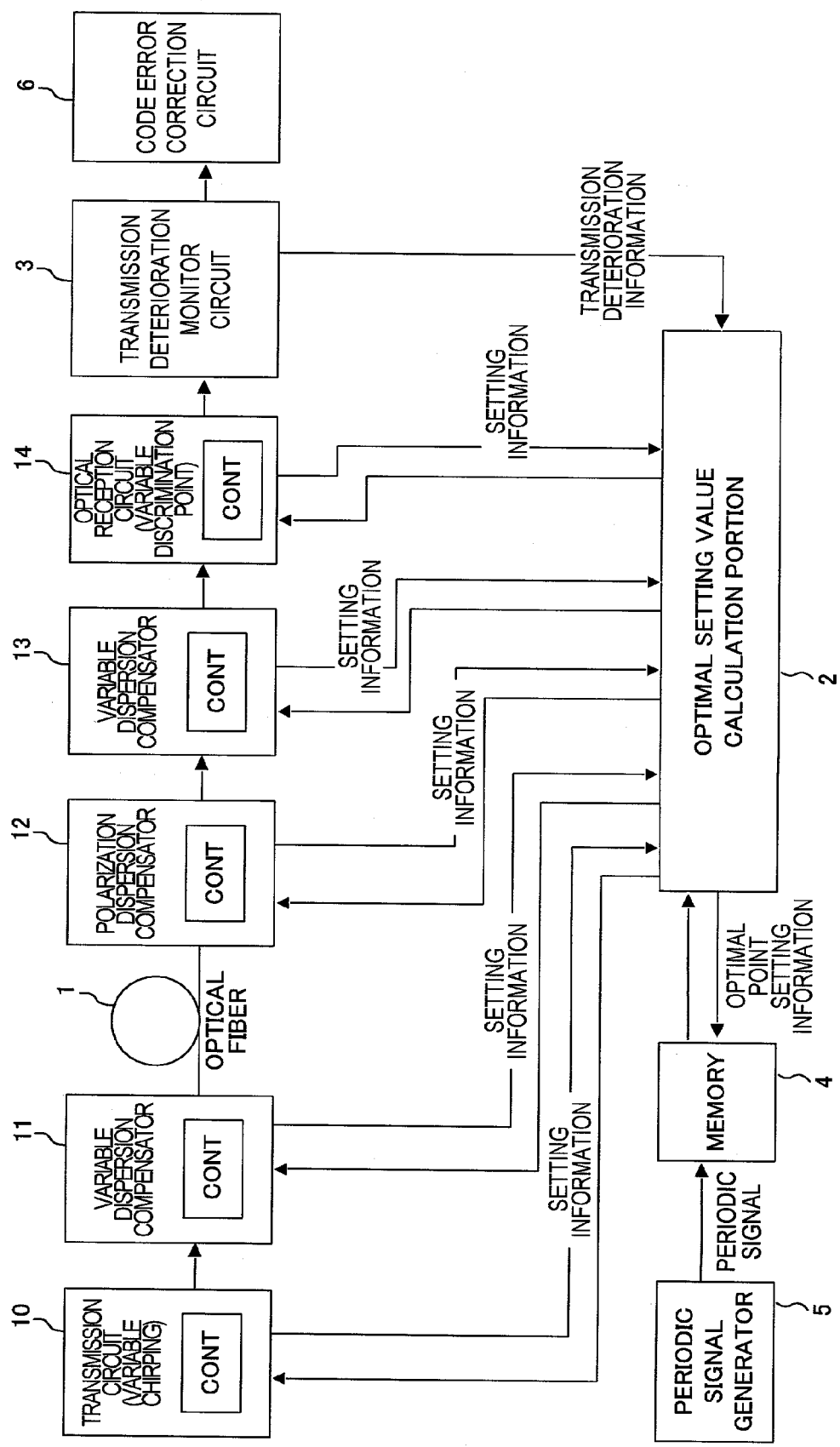
FIG. 5 shows an embodiment of an overall system configuration adopting the present invention.

In FIG. 5, there is shown an exemplary overall system configuration in which the present invention is applied. Compensators located at the preceding stages of optical fiber 1 are a transmission circuit 10 enabling variable chirping, and a variable dispersion compensation circuit 11 on the transmission side. Also, compensators located at the following stages of optical fiber 1 are; a polarization dispersion compensation circuit 12; a variable dispersion compensation circuit 13 on the reception side; and an optical reception circuit 14 which enables to control discrimination level. There are also provided a code deterioration monitor circuit 3 and a code error correction circuit 6 on the output side of optical reception circuit 14.

Here, with regard to the transmission deterioration of code deterioration monitor circuit 3, it is possible to apply a variety of methods.

For example, it is possible to use error correction information from code error correction circuit 6, or B1/B2 in SDH format or SONET format. Otherwise, it is possible to monitor the deterioration according to the reception spectral intensity or multilevel eye aperture degree.

According to the present invention, VIPA (virtually imaged phased array) devices may be used for the above-mentioned variable compensation circuits 11, 13. When wavelength-multiplexing transmission is employed in the optical communication system, the aforementioned variable dispersion compensation applied in variable dispersion compensation circuits 11, 13 compensates a plurality of wavelengths collectively.

Transmission circuit 10 is constituted by known optical signal transmission circuits such as a semiconductor laser, an LN modulator and a driver, which includes a control circuit for variable chirping. Variable dispersion compensation circuit 11 on the transmission side and variable dispersion compensation circuit 13 on the reception side are respectively constituted by a variable dispersion compensator and a control circuit.

Polarization dispersion compensation circuit 12 is constituted by a polarization controller, a double refraction device, a polarization monitor, a control circuit, etc. Optical reception circuit 14 is also constituted by a light receiving element, an amplifier, a clock regeneration and discrimination circuit, a serial/parallel conversion circuit, and a control circuit for controlling the discrimination level.

The circuits 10–14 having the aforementioned compensation function (hereinafter simply referred to as compensators) are used in an existing optical communication system also configured with the above-mentioned components, and therefore explanation of the detailed operation is omitted here.

Optimal setting value calculation portion 2 receives transmission deterioration information from transmission deterioration monitor circuit 3, to transmit the calculated result successively to any compensator 10–14 on which the control is required. On reception of a control completion notification against the calculation result information from the corresponding circuit, the calculation result information is forwarded to the succeeding compensator.

As mentioned earlier, each compensator 10–14 includes a controller CONT for controlling to minimize the transmission deterioration.

Here, in the present invention, it is also possible to employ a configuration using code error information before correction, instead of error-corrected information, for the control. When code error correction circuit 6 is not used, it is possible to control using error information based on parity check result of B1, B2, etc. included in SDH format or SONET format.

Figure 6:
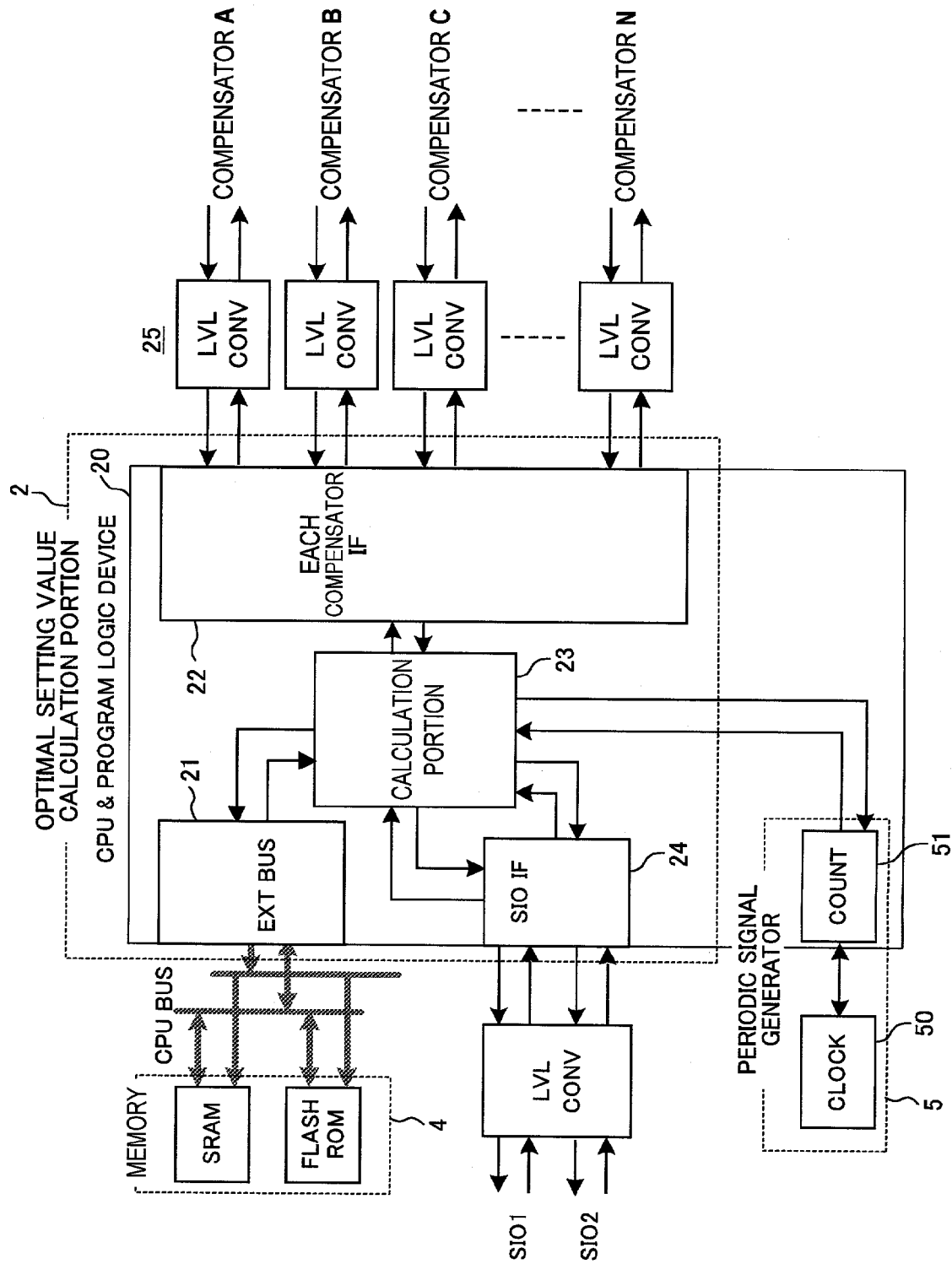
FIG. 6 shows an optimal setting value calculation portion 2, and a memory 4 and a periodic signal generator connected to optimal setting value calculation portion 2.

In FIG. 6, there is shown an exemplary circuit block diagram of optimal setting value calculation portion 2, as well as memory 4 and periodic signal generator 5 being connected thereto. The main function of optimal setting value calculation portion 2 is constituted by a CPU and a programmable logic device 20, internally being constituted by an external bus (EXT BUS) 21, interface (IF) 22 to each compensator, calculation portion 23, and an SIO interface (SIO IF) 24.

Memory 4 is constituted by an SRAM and a flash ROM, to store a CPU program, an optimal setting value of the average year, an optimal setting value of the preceding day, etc.

Periodic signal generator 5 generates periodic signals required for each compensator 10–14 to feed at required intervals. The periodic signals are generated in counter 51 internally provided in programmable logic device 20 using a clock supplied from the system or a clock 50 generated by a crystal oscillator or the like.

External bus (EXT BUS) 21 provided inside of programmable logic device 20 receives and transmits data from/to memory 4. Also, each compensator interface (IF) 22 performs an interfacing function with each compensator 10–14. Calculation portion 23 performs calculation based on data stored in memory 4 and data received from each compensator interface (IF) 22. The calculation is initiated by periodic signals received from periodic signal generator 5. According to the calculation result, calculation portion 23 controls to transmit signals and data to each compensator interface (IF) 22 and memory 4, respectively.

The input/output signal from each compensator interface (IF) 22 is interfaced with each compensator 10–14 through level converters (LVL CONV) 25 which level-converts for adjusting signal voltage levels with each compensator 10–14. SIO interface (SIO IF) 24 is an interface portion having RS-232C interface or the like, being used for monitoring the CPU status and for altering the settings, etc.

Now, the operation of the present invention in the aforementioned configuration of the exemplary embodiment is illustrated hereinafter referring to the operation flowchart.

Figure 7:
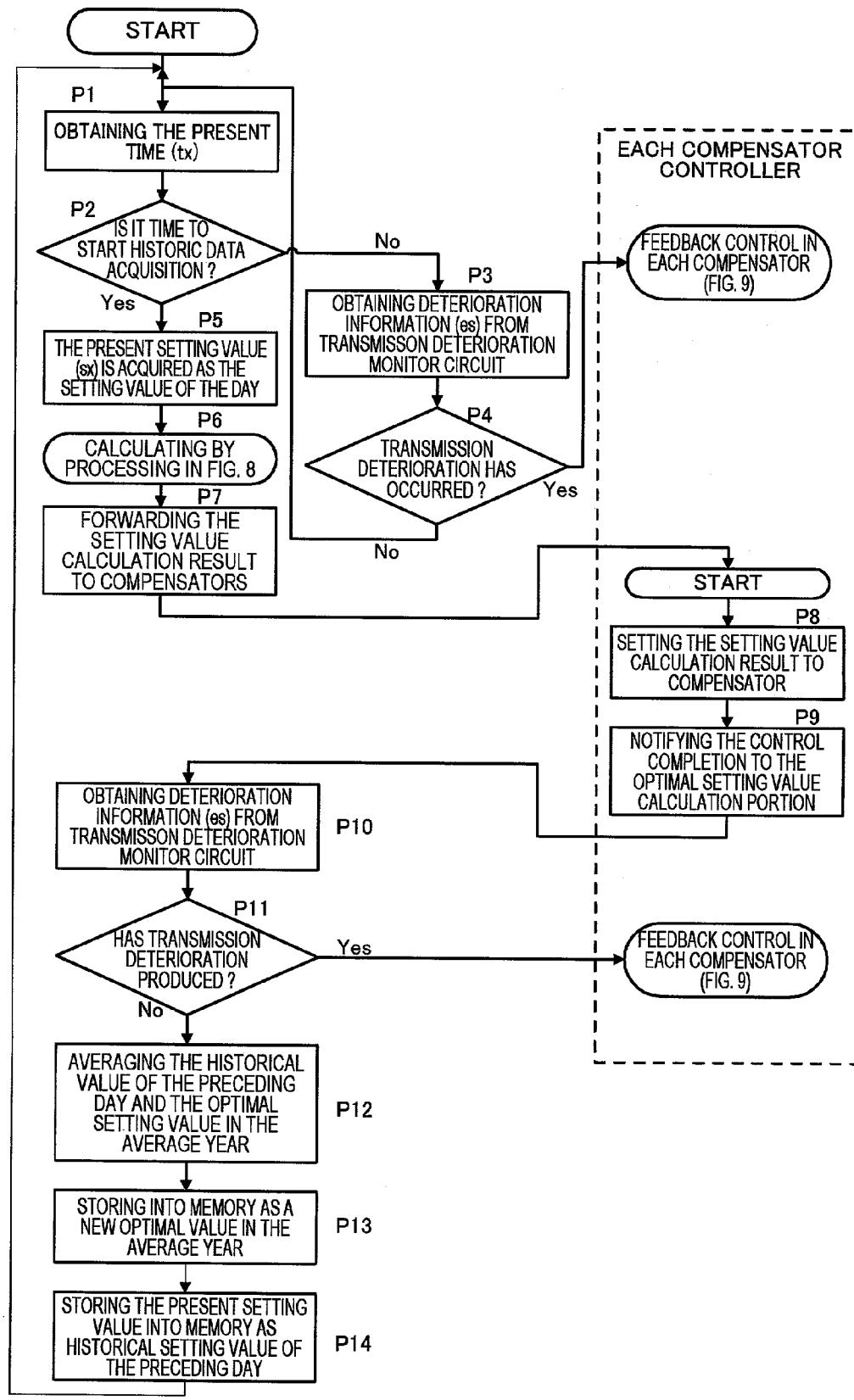
FIG. 7 shows an operation flowchart of feedforward control by the optimal setting according to the present invention.
Figure 8:
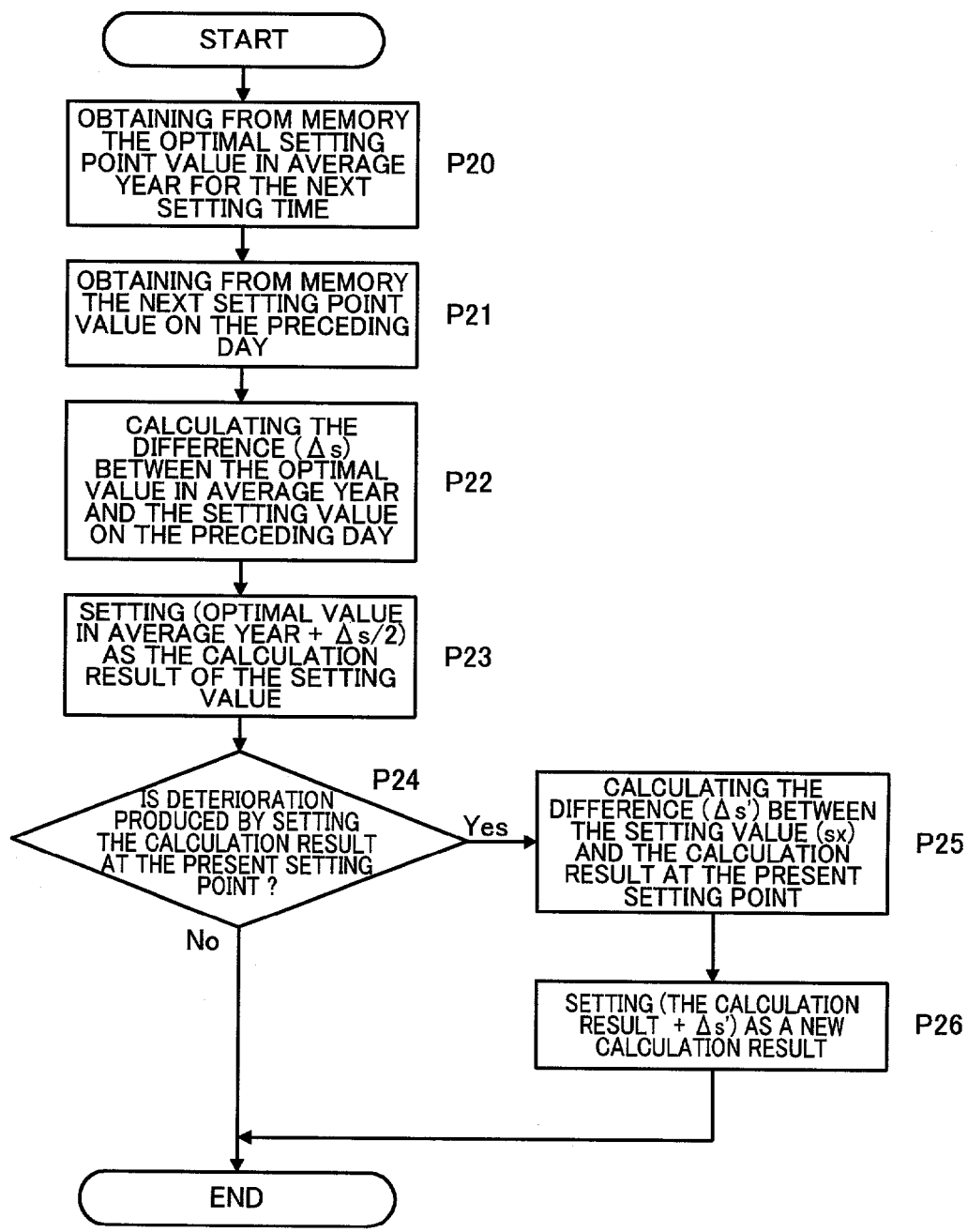
FIG. 8 shows a flowchart illustrating a setting value calculation processing.

FIGS. 7, 8 show operation flowcharts of the feedforward control in the optimal setting according to the present invention.

In optimal setting value calculation portion 2, the present time is obtained (procedure P1), to determine whether or not the historical data acquisition is to be started now (procedure P2). If it is not the historical data acquisition time yet (procedure P3, No), deterioration information (es) is obtained from transmission deterioration monitor circuit 3 (procedure P3).

Here, the period of the aforementioned historical data acquisition time, or the period of performing setting control of the optimal setting value, is set so that the control is carried out on a predetermined time-by-time basis. However, it is also possible to employ variable period to be set according to the variation rate of the transmission deterioration.

Figure 9:
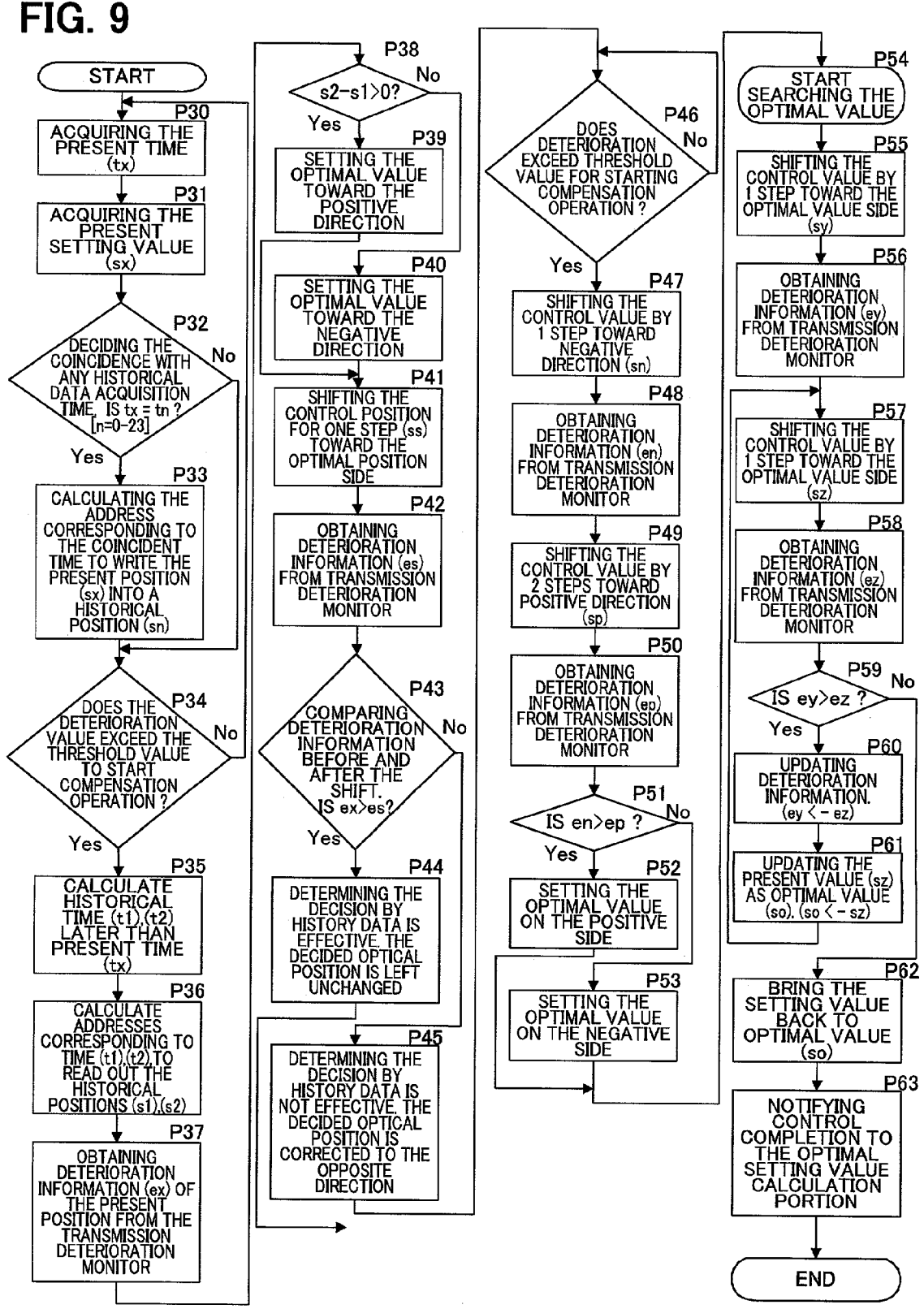
FIG. 9 shows an explanation diagram illustrating feedback control according to the present invention being performed in each compensator.

If it is determined from the deterioration information (es) that the transmission deterioration has occurred (procedure P4, Yes), the feedback control of each compensator is carried out, which is illustrated in FIG. 9. On the other hand, if there is no transmission deterioration occurred, the process returns to procedure P1.

In procedure P2, if it is the time for starting historical data acquisition (procedure P2, Yes), the present setting value (sx) is acquired as the setting value of the day of interest (procedure P5), and then the setting value calculation processing shown in FIG. 8 is carried out (procedure P6).

Here, referring to FIG. 8, the setting value calculation processing is illustrated hereafter. First, in FIG. 8, with regard to the next setting time, an optimal setting point value in the average year is obtained from memory 4 (procedure P20). Also with regard to the next setting time, the setting point value on the preceding day is obtained from memory 4 (procedure P21).

Next, the difference ($\Delta s$) between the aforementioned optimal value in the average year and the setting value on the preceding day is calculated (procedure P22. Refer to FIG. 4B.) Thus, (the optimal value in the average year+$\Delta s/2$) is set as the calculation result of the setting value (procedure P23).

At the present setting point, the decision is made whether or not transmission deterioration is produced by setting the setting value according to the calculation result (=the optimal value in the average year+$\Delta s/2$) (procedure P24). If transmission deterioration is not produced (procedure P24, No), the process returns to FIG. 7, and the calculation result of the setting value is forwarded to each compensator 10–14 (procedure P7).

On the other hand, if it is determined that transmission deterioration is produced (procedure P24, Yes), the difference ($\Delta s'$) between the setting value (sx) at the present setting point and the setting value of the calculation result is obtained (procedure P25). Next, the setting value obtained by adding $\Delta s'$ to the setting value of the calculation result is set as a new calculation result, to store into memory 4 (procedure P26). Thereafter the process returns to procedure P7 shown in FIG. 7.

In procedure P7, the setting value calculation result is forwarded to each compensator 10–14. In each compensator 10–14, the setting value calculation result is set into each compensator (procedure P8), and then the control completion is notified to optimal setting value calculation portion 2 (procedure P9).

On receiving the control completion notification from each compensator 10–14, optimal setting value calculation portion 2 obtains deterioration information (es) from transmission deterioration monitor circuit 3 (procedure P10). If transmission deterioration has been produced (procedure P11, Yes), then the process proceeds to feedback control processing for each compensator (FIG. 9).

On the other hand, if transmission deterioration has not been produced (procedure P11, No), an average value between the setting value on the preceding day and the optimal setting value in the average year is calculated (procedure P12), to store into memory 4 as a new optimal value in the average year (procedure P13). Further, the present setting value is stored into memory 4 as the historical setting value of the preceding day (procedure P14). The process then returns to procedure P1.

In FIG. 9, a processing flowchart in controller CONT of each compensator 10–14 is shown. Controller CONT is provided with a non-illustrated memory similar to memory 4 being connected to optimal setting value calculation portion 2 for storing setting values. This memory can be read and written using time information as an address.

Now, the processing flowchart is explained hereafter referring to FIG. 3A for the sake of understanding the control procedure. Controller CONT first acquires the present time (tx) (procedure P30), and then acquires the present setting value (position) (sx) (procedure P31). If the present time (tx) coincides with any historical data acquisition time among the historical data for 24 hours stored in the memory (procedure P32. tx=tn, where n=0–23), the address corresponding to the coincident time is calculated. Thereafter the present position is written into a historical setting value (position) (sn) (procedure P33).

Thereafter, if it is determined that the deterioration value exceeds the threshold value for starting the compensation operation (procedure P34, Yes), the historical time (t1), (t2) later than the present time (tx) is obtained (procedure P35).

Addresses corresponding to the above obtained time (t1), (t2) are then calculated to read out the historical positions (s1), (s2) (procedure P36).

Meanwhile, the deterioration information (ex) detected by transmission deterioration monitor circuit 3 is acquired through optimal setting value calculation portion 2 (procedure P37). Next, if the relation between the historical positions (s1), (s2) is (s2)>(s1) (procedure P38, Yes), it is determined that the transmission deterioration will be decreased by shifting the compensator setting value in the positive direction (i.e. by increasing the compensator setting value). Accordingly the optimal value is set toward the positive direction (procedure P39).

To the contrary, if the relations between (s2) and (s1) is (s2)<(s1) (procedure P38, No), the optimal setting position is shifted toward the negative direction (procedure P40). In such a manner, the past control direction is determined from the historical data to control the optimal setting value in the same direction.

Thereafter, the control position is shifted by one step (ss) toward the optimal position side set by procedure P39 or P40 (procedure P41). Next, the transmission deterioration information (es) is acquired from transmission deterioration monitor circuit 3 (procedure P42).

The acquired transmission deterioration information (es) is compared to the transmission deterioration information (ex) before the shift (procedure P43). As a result of the comparison, if transmission deterioration (ex)>(es), it is determined the degree of transmission deterioration has been improved. Therefore, the optimal position having been determined using the historical data is confirmed effective, and the result is left unchanged (procedure P44). On the contrary, if transmission deterioration (ex)<(es), the optimal position having been decided before is determined ineffective, and the optimal position is corrected to the opposite direction (procedure P45).

In this situation, it is determined again whether or not the compensation operation threshold value is exceeded (procedure P46). If the compensation operation threshold value is exceeded, the control value is shifted by one step toward the negative direction (sn) (procedure P47). The deterioration information (en) is then acquired from transmission deterioration monitor circuit 3 (procedure P48).

Next, the control value is shifted by two steps in the positive direction (sp) (procedure P49), and the deterioration information (ep) is acquired from transmission deterioration monitor circuit 3 (procedure P50) to compare the obtained deterioration information (en) with (ep) (procedure P51). Namely, the deterioration conditions are determined when the present setting value is shifted by one step in both directions.

In the comparison results in (en)>(ep), the optimal value is set on the positive side (procedure P52). Else if (en)<(ep), the optimal value is set on the negative side (procedure P53).

When the setting direction toward the optimal value is determined as a result of the above procedure, the optimal value is started to search (procedure P54). In this optimal value search, the control value is shifted one step by step toward the optimal value side (sy, sz) (procedures P55, P57). The deterioration information is acquired each time the control value is shifted (ey, ez) (procedures P56, P58).

Thereafter the values (ey) and (ez) are compared with each other (procedure P59).

Referring to FIG. 3A, if (ey)>(ez) (procedure P59, Yes), the setting value is still controlled toward the direction of decreasing the transmission deterioration, and therefore the deterioration information is updated to (ez) (procedure P60). The present setting value (sz) is then written as the optimal value (so) (procedure P61), and the process returns to procedure P57.

Meanwhile, in procedure P59, if (ey)<(ez), it is understood that the control has already passed through the optimal value. Therefore the setting value is brought back to the optimal value (so) (procedure P62). Thereafter the completion of optimal value setting control is notified to optimal setting value calculation portion 2, to complete the processing (procedure P63).

As the embodiment of the present invention has been described referring to the accompanied drawings, the present invention enables to reduce the possibility of transmission deterioration occurrence in combination with the feedforward control. Namely, by compensating beforehand with an estimated setting value, it becomes possible to suppress the occurrence of transmission deterioration in advance.

Moreover, it becomes possible to estimate the direction to be shifted first, enabling to reduce the occurrence of transmission deterioration. Accordingly, it is possible to minimize transmission deterioration which is generated when starting compensation operation in the conventional art.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A transmission characteristic compensation control system comprising:
   a variable compensator having a control circuit;
   a transmission deterioration monitor circuit detecting transmission deterioration;
   a memory storing optimal setting values set into the control circuit previously; and
   an optimal setting value calculation portion calculating an optimal setting value for the control circuit by predicting, at a predetermined time progress, transmission deterioration at a next predetermined time progress based on the optimal setting values stored in the memory on a predetermined time base, and setting into the control circuit the optimal setting value by which said variable compensator compensates for the transmission deterioration predicted.

2. The transmission characteristic compensation control system according to claim 1, wherein the optimal setting value calculated based on the optimal setting values stored in the memory is a calculation result of adding one half of the difference between the optimal setting value in the average year and the historical setting value of the preceding day to the optimal setting value in the average year.

3. The transmission characteristic compensation control system according to claim 2, wherein the optimal setting value calculation portion stores an average value between the historical setting value of the preceding day and the optimal setting value in the average year into the memory as a new optimal setting value in the average year.

4. The transmission characteristic compensation control system according to claim 3, wherein the optimal setting value calculation portion retains the present setting value in the memory as a new historical setting value of the preceding day.

5. The transmission characteristic compensation control system according to claim 1, wherein the optimal setting value calculation portion orders feedback control to the variable compensator when the transmission deterioration monitor circuit detects the transmission deterioration exceeding a threshold value before the predetermined time progress.

6. The transmission characteristic compensation control system according to claim 5, wherein the feedback control is performed by determining a setting value control direction based on comparison of the transmission deterioration produced when shifting the setting value in both positive direction and negative direction against the present setting value and then shifting the setting value in the determined direction to obtain the optimal setting value.

7. An optical communication system comprising:
   a plurality of variable compensators each having a control circuit;
   a transmission deterioration monitor circuit;
   a memory retaining optimal setting values set into the control circuit previously; and
   an optimal setting value calculation portion calculating an optimal setting value for the control circuit of each of the plurality of variable compensators after determining a control direction of compensating transmission deterioration detected by the transmission deterioration monitor circuit based on the optimal setting values retained in the memory to feedback-control a corresponding control circuit and predicting, at a predetermined time progress, transmission deterioration at a next predetermined time progress based on the optimal setting values stored in the memory on a predetermined time base, each variable compensator compensating the transmission deterioration predicted to feedforward control the optimal setting value set into the control circuit thereof.

8. The optical communication system according to claim 7, wherein the each control circuit in the plurality of variable compensators performs feedback control when the transmission deterioration monitor circuit detects transmission deterioration at the timing excluding when the optimal setting value calculation portion performs feedforward control at every predetermined time progress.

9. The optical communication system according to claim 7, wherein the feedforward control is performed successively for each compensator among the plurality of variable compensators.

10. The optical communication system according to claim 7, wherein the plurality of variable compensators include at least two control combinations or more out of light output power control, chirp parameter control, variable dispersion compensation control on the transmission side, polarization dispersion compensation control, variable dispersion compensation control on the reception side, and discrimination phase control.

11. The optical communication system according to claim 7, wherein both the optimal setting value calculation and the feedforward control are performed at variable intervals corresponding to the variation rate of transmission deterioration.

12. A transmission characteristic compensation control system comprising:
    a variable compensator having a control circuit;
    a memory storing optimal setting values set into the control circuit previously; and
    an optimal setting value calculation portion predicting, at a predetermined time progress, a transmission characteristic at a next predetermined time progress, based on the optimal setting values stored in the memory, and setting into the control circuit an optimal setting value calculated to compensate for the transmission characteristic predicted.

13. The transmission characteristic compensation control system according to claim 12, wherein the optimal setting value is a calculation result of adding one-half of a difference between an average optimal setting value in an average year and a historical setting value of a preceding day to the average optimal setting value.

14. The transmission characteristic compensation control system according to claim 12, wherein the optimal setting value calculation portion stores an average value between a historical setting value of a preceding day and an average setting value in an average year into the memory as a new optimal setting value in the average year.

15. The transmission characteristic compensation control system according to claim 12, wherein the optimal setting value calculation portion retains a present setting value in the memory as a new historical setting value of a preceding day.

16. A method of controlling an optical communication system, comprising:
    storing historical optimal compensator setting point information;
    calculating a future optimal compensator setting point value based on the historical optimal compensator setting point information;
    applying the future optimal compensator setting point value to a compensator in the optical communication system; and
    including the future optimal compensator setting point value with the historical optimal compensator setting point information.

17. The method recited in claim 16, wherein the historical optimal compensator setting point information includes a preceding day optimal compensator setting point value calculated during a preceding day.

18. The method recited in claim 16 wherein the historical optimal compensator setting point information includes an average optimal compensator setting point value determined from optimal compensator setting point values calculated during at least one preceding year.

19. The method recited in claim 16, wherein said calculating of the future optimal compensator setting point value includes calculating a difference between an average year optimal compensator setting point value and a preceding day optimal compensator setting point value.

* * * * *